Aug. 13, 1968     R. W. HOEPPEL     3,397,348

PROXIMITY CURRENT DETECTOR

Filed May 16, 1966

Raymond W. Hoeppel
INVENTOR.

United States Patent Office 3,397,348
Patented Aug. 13, 1968

3,397,348
PROXIMITY CURRENT DETECTOR
Raymond W. Hoeppel, P.O. Box 5,
Oak View, Calif. 93022
Continuation-in-part of application Ser. No. 219,602,
Aug. 27, 1962. This application May 16, 1966, Ser.
No. 550,371
6 Claims. (Cl. 317—123)

ABSTRACT OF THE DISCLOSURE

An instrument for detecting and measuring current flowing through a nearby wire comprises a magnetically biased vibrating reed relay having a capacitor to retard its rate of vibration. The current flow is detected or measured by a transducer that is switched by the vibrating contacts of the relay, the vibration rate varying with the amount of current flowing through the wire.

---

This is a continuation-in-part of U.S. Patent No. 3,252,057 filed Aug. 27, 1962.

This invention relates to a device for detecting the presence of current flowing in a wire without direct connections to the wire, and more particularly to a magnetic current detector employing a novel type of vibrating reed switch.

Current detectors in use today usually require direct connection to a wire, and where a direct connection is not required, they are either low in sensitivity or require complicated circuitry involving amplifiers. Also they usually dissipate power while in standby condition.

One object of this invention, therefore, is to provide a proximity current detector that is very simple in construction and inexpensive, while at the same time being very sensitive to small current flow in an isolated wire.

Another object is to provide a current detector that will operate on small amounts of power and will not necessarily use power while in standby alert condition.

Another object is to provide a current detector that may be adjusted to produce a control or warning action when the current falls below or rises above a predetermined value.

The basic detecting element in the current detector of this invention is the sensitive vibrating reed switch described more fully in U.S. Patent No. 3,252,057.

Figure 1:
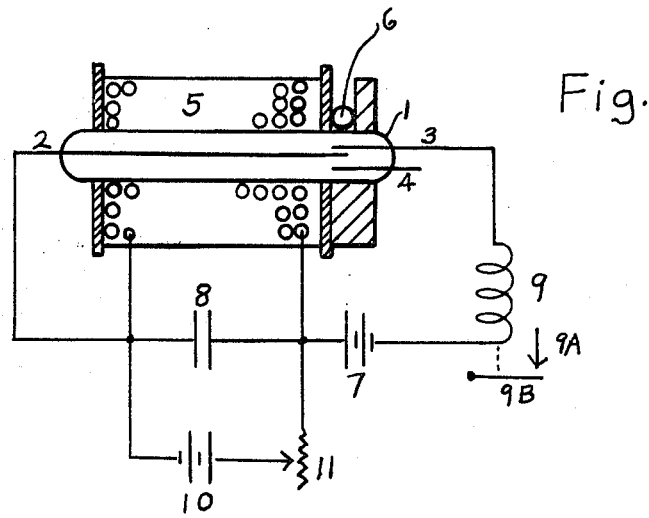
FIGURE 1 shows in cross section a current detector employing a slow release relay for control purposes, and using a current-carrying solenoid as a bias source.

One form of such vibrating switch is shown in the device of FIGURE 1. Here a conventional double throw magnetic reed switch is connected with its normally closed contacts, 2 and 3, controlling a current in solenoid 5, the current being provided by power source 7. Switch 2 is mounted within solenoid 5. When current flows through solenoid 5 the normally closed contacts, 2 and 3, open and the normally open contacts, 2 and 4, close because of the magnetic field created by the solenoid. When contacts 2 and 3 open, current ceases to flow through the solenoid and these contacts again close by spring bias because of the collapse of the magnetic field. The process is thus repeated causing a vibration to be set up in the switch as long as power is supplied to the circuit. A capacitor, 8, is shunted across the solenoid to stabilize the vibration of the switch and to reduce its frequency of vibration. Relay 9 is a slow release relay in the vibrating circuit to produce steady state switching. It keeps contacts 9A and 9B closed as long as the switch is vibrating and these contacts may be used for signalling or control purposes.

Now if a regulated, steady current is applied to solenoid 5 by means of power source 10 and variable resistor 11, an additional flux will be created in the vicinity of the vibrating switch causing a steady, magnetic biasing action on the switch. If this bias flux opposes that produced by the intermittant current from power source 7, then the frequency of vibration of the switch will increase. If this bias re-inforces that produced by the intermittent current the frequency of vibration will be lessened until at some value of current in the bias circuit, vibration will cease entirely. At that point, a slight increase in bias of the proper polarity will initiate vibration, or a slight increase in flux from any other external flux source of the proper polarity will initiate vibration. Hence if the switch is on the verge of vibration and is placed near a conductor carrying a current in such direction that it produces a flux at the switch that opposes the bias flux, then vibration will start when this current flows. In FIGURE 1 provision is made for the placement of a conductor 6, carrying a current, in a fixed position with respect to the switch. Conductor 6 is shown in the position where it is most effective in operating the switch but if the current through the wire is sufficiently high, the conductor may be placed further away, but usually in a position generally transverse to the major axis of the switch.

Another method of lessening the sensitivity of the detector is by increasing the bias. Thus the switch may be adjusted to start to vibrate at a wide range of currents carried by the conductor, and in this manner may serve as an overload detector with a variable set point, which is attained by manual adjustment of variable resistor 11.

The switch will respond to either direct or alternating current flowing through the conductor, 6, with currents as low as 0.1 ampere being readily detected.

The detector of FIGURE 1 can also be used to indicate a drop in current flowing through conductor 6. This is accomplished by adjusting the bias, by means of resistor 11, while current is flowing through conductor 6 so that the switch just stops vibrating. The current flowing through conductor 6 must be of such polarity that it produces a flux that reinforces the bias flux. Then when there is a decrease in the current the switch will be set in vibration, causing relay 9 to close contacts 9A and 9B.

Figure 2:
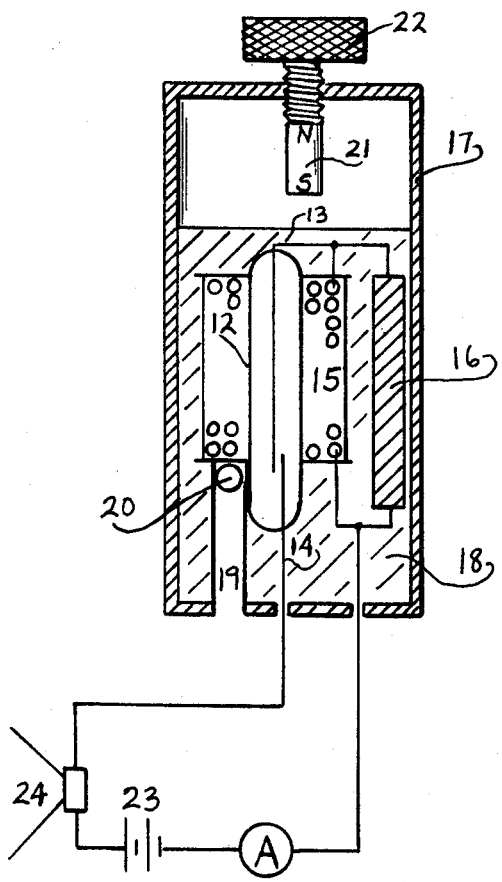
FIGURE 2 shows in cross section a current sensor using a permanent magnet as a bias source and employing a loudspeaker as an audible indicator of the status of the current, and an ammeter as a current readout device.

In FIGURE 2 is shown another embodiment of the invention wherein the bias flux is produced by a permanent magnet instead of by solenoid, and adjustment of bias is attained by moving the magnet with respect to the switch. In this embodiment the normally open contacts of the reed switch are used for switching instead of the normally closed contacts as in FIGURE 1, thus necessitating a different polarity in biasing than in the first device.

In FIGURE 2, a conventional, normally open magnetic reed switch is housed within solenoid 15, and as before the switch contacts, 13 and 14, are connected in series with solenoid 15 and power source 23. In addition, an ammeter, A, and a loudspeaker, 24 are in this same series circuit. A capacitor, 16, shunts the solenoid. The vibrating switch assembly is housed within container 17, by means of a potting compound, 18, although other methods of housing can be used. Screw 22 is threaded into the top of container 17 and a permanent magnet, 21 is attached to the end of the screw. A slot, 19, cut into the side of the container serves to accommodate conductor 20, through which passes the current to be detected.

Before the switch of FIGURE 2 can be set into vibration, contacts 13 and 14 must first be biased to a closed position by means of permanent magnet 21. Current will then flow through these contacts, the solenoid, the ammeter and the loudspeaker, and this current must produce a flux at the switch that opposes that of the bias magnet. When the current flows, the flux produced by the solenoid causes the contacts, 13 and 14 to open, thus stopping this current flow whereupon they are closed again by the bias force. This cycle is repeated as long as power is applied to the circuit, setting up a vibration in the switch contacts and causing a sound to issue from the loudspeaker. After the switch has been set into vibration the frequency of vibration will be related to the bias flux produced by magnet 21, the frequency increasing as this flux is increased and decreasing if this bias is decreased, such as by moving magnet 21 further away from the switch by means of screw 22. At some definite value of bias flux, vibration will stop, and then any increase in bias flux will initiate vibration.

If the switch is not vibrating and is on the verge of vibration, the passage of a small amount of current through conductor 20 will start vibration provided the flux produced by this current reinforces the bias flux. Then as the current in conductor 20 is increased, the frequency of vibration will increase and the current passing through the ammeter, A, will increase proportionately. Thus by referring to the ammeter reading, a measure of the amount of current flowing through the conductor, 20 will be attained. Hence the amount of current flow in conductor 20 may be ascertained by listening to the pitch of the sound issuing from the loudspeaker or by reading the ammeter. Other forms of electromechanical transducers may be controlled by the vibrating switch contacts, such as frequency sensitive relays, slow release relays, solid state relays and the like.

It is obvious that the device of FIGURE 1 can be biased by permanent magnets and that of FIGURE 2 can be biased by solenoid runs, such as is shown in FIGURE 1. Both types of biasing may be used in one detector, and more than one magnet is often used to enable more critical adjustment of the bias flux. Either device in FIGURES 1 and 2 may be used for switching any of the various electromechanical transducers discussed. The device of FIGURE 1 may perform this switching either by contacts 2 and 3 or by contacts 2 and 4. Either detector will sense either alternating or direct current flowing through the conductor, and either may be used to sense overload or underload currents by proper adjustment of the amount and polarity of the bias, as has been previously described. The bias produced by a permanent magnet can be varied by moving the magnet in any direction with respect to the switch either in linear or rotational fashion. The switches need not be housed in the operating solenoids as long as they are in flux coupling relationship with the solenoids. The bias solenoid need not be integral with the operating solenoid as in FIGURE 1, but can be a separately wound coil.

Although this invention is described by means of embodiments shown in the drawings, yet various modifications can, of course, be made without departing from the scope of the following claims.

What is claimed is:

1. A current detector for detecting the flow of current in an isolated wire without connections thereto, said detector comprising in combination: a vibrating switch assembly comprising in combination an operating solenoid, a magnetic reed switch in flux coupling relationship with said operating solenoid, said switch comprising at least two ferromagnetic reed contacts, said contacts being responsive to a magnetic field, said switch controlling a current through said solenoid, means to connect a power source with said switch and solenoid, capacitive means connected in circuit with said switch and solenoid to stabilize the vibration of said switch, and a source of constant magnetic bias in flux coupling relationship with said switch; electromagnetic means responsive to said magnetic reed switch to translate the vibration of said switch into a mechanical displacement; and means to mount said vibrating switch assembly in a fixed position with respect to a conductor carrying an electric current, said assembly being located in such position that said switch is in flux coupling relationship with the electromagnetic field emanating from said conductor.

2. A current detector according to claim 1 wherein said reed switch comprises at least two normally open contacts and at least two normally closed contacts and said normally closed contacts control the current through said solenoid.

3. A current detector according to claim 1 wherein said source of constant magnetic bias comprises at least one permanent magnet, said magnet being located in a fixed position with respect to said switch.

4. A current detector according to claim 3 wherein the position of said magnet with respect to said switch is manually adjustable.

5. A current detector according to claim 1 where said source of constant magnetic bias comprises a bias solenoid carrying a constant current.

6. A current detector according to claim 5 including means to manually vary the amount of said current flowing through said bias solenoid.

References Cited

UNITED STATES PATENTS

| | | | |
|---|---|---|---|
| 2,073,913 | 3/1937 | Wigan | 335—87 X |
| 2,550,605 | 4/1951 | Schenck | 335—87 X |
| 3,227,838 | 1/1966 | Hoeppel | 335—153 |
| 3,251,961 | 5/1966 | Wintriss | 335—151 X |
| 3,264,423 | 8/1966 | Mejean et al. | 335—153 |

LEE T. HIX, *Primary Examiner.*

J. A. SILVERMAN, *Assistant Examiner.*